(12) United States Patent
Balzer et al.

(10) Patent No.: US 9,186,984 B2
(45) Date of Patent: Nov. 17, 2015

(54) COVER WITH FILLER NECK

(71) Applicant: Elkamet Kunststofftechnik GmbH, Biedenkopf (DE)

(72) Inventors: Steffen Balzer, Bad Endbach (DE); Arnd Wagner, Gladenbach (DE)

(73) Assignee: ELKAMET KUNSTSTOFFTECHNIK GMBH, Biedenkopf (DE)

( * ) Notice: Subject to any disclaimer, the term of this patent is extended or adjusted under 35 U.S.C. 154(b) by 0 days.

(21) Appl. No.: 14/132,010

(22) Filed: Dec. 18, 2013

(65) Prior Publication Data

US 2014/0209616 A1 Jul. 31, 2014

(30) Foreign Application Priority Data

Dec. 19, 2012 (DE) .......................... 10 2012 112 666

(51) Int. Cl.
| | | |
|---|---|---|
| *B60K 15/04* | (2006.01) | |
| *F01N 3/20* | (2006.01) | |
| *F02M 37/00* | (2006.01) | |
| *B60K 15/03* | (2006.01) | |

(52) U.S. Cl.
CPC ............. *B60K 15/0406* (2013.01); *B60K 15/04* (2013.01); *B60K 15/03* (2013.01); *F01N 3/2066* (2013.01); *F02M 37/0088* (2013.01)

(58) Field of Classification Search
USPC ................ 220/23.2, 23.4, 86.2, 562; 141/350
See application file for complete search history.

(56) References Cited

U.S. PATENT DOCUMENTS

| | | | | |
|---|---|---|---|---|
| 5,971,017 | A * | 10/1999 | Kinoshita et al. ............. | 137/588 |
| 6,223,526 | B1 * | 5/2001 | Wissler et al. .................. | 60/286 |
| 6,257,360 | B1 * | 7/2001 | Wozniak et al. ............. | 180/69.5 |
| 6,263,924 | B1 * | 7/2001 | Grosser ......................... | 141/102 |
| 6,661,339 | B2 * | 12/2003 | Muirhead ...................... | 340/505 |
| 7,543,667 | B2 * | 6/2009 | Hwang et al. ................ | 180/69.4 |
| 8,167,009 | B2 * | 5/2012 | Vandervoort et al. ......... | 141/349 |
| 2002/0170616 | A1 * | 11/2002 | Channing .......................... | 141/9 |
| 2005/0022515 | A1 * | 2/2005 | Stiermann ....................... | 60/286 |
| 2009/0152274 | A1 * | 6/2009 | Shearn .......................... | 220/564 |
| 2009/0188923 | A1 * | 7/2009 | Versaw et al. ................ | 220/564 |
| 2011/0036079 | A1 * | 2/2011 | Capelle et al. ................. | 60/298 |
| 2012/0217239 | A1 * | 8/2012 | Vandervoort et al. ........ | 220/86.2 |
| 2013/0292386 | A1 * | 11/2013 | Klauer et al. ................. | 220/553 |

FOREIGN PATENT DOCUMENTS

| | | |
|---|---|---|
| DE | 102008023073 A1 | 11/2009 |
| DE | 102009045500 A1 | 4/2011 |
| EP | 1736350 A2 | 12/2006 |
| EP | 2479393 A1 | 7/2012 |

* cited by examiner

*Primary Examiner* — Anthony Stashick
*Assistant Examiner* — Mollie Llewellyn
(74) *Attorney, Agent, or Firm* — Leydig, Voit & Mayer, Ltd.

(57) ABSTRACT

A cover for a service fluid tank arrangement having a first service fluid tank and a second service fluid tank includes a housing having a housing wall through which a first opening and a second opening extend. The first opening is configured to be connected to a service fluid inlet of the first service fluid tank and the second opening is configured to be connected to a service fluid inlet of the second service fluid tank. At least one of the first opening and the second opening has a filler neck that extends from the housing wall in at least one direction and is configured as a connector for a service fluid line.

12 Claims, 7 Drawing Sheets

COVER WITH FILLER NECK

CROSS-REFERENCE TO PRIOR APPLICATIONS

Priority is claimed to German Patent Application No. DE 10 2012 112 666.6, filed on Dec. 19, 2012, the entire disclosure of which is hereby incorporated by reference herein.

FIELD

The present invention relates to a cover for a service fluid tank arrangement comprising a first service fluid tank and a second service fluid tank, with a cover housing that has a first opening for connection to a service fluid inlet of the first service fluid tank and a second opening for connection to a service fluid inlet of the second service fluid tank, whereby the openings extend through a housing wall of the cover. Moreover, the invention relates to a service fluid tank system having the cover according to the invention.

BACKGROUND

Owing to rising requirements in terms of the environmental friendliness of motor vehicles, increasingly stringent restrictions apply to internal combustion engines when it comes to emission limit values. Particularly vehicles such as, for example, trucks, construction vehicles or agricultural vehicles have been subject to ever-stricter emission standards over the past years. The requirements stipulated in these standards can often no longer be met only with measures involving engine management but rather they additionally call for the after-treatment of exhaust gases. This exhaust-gas after-treatment, often also in combination with other methods, frequently involves the use of selective catalytic reduction (SCR). In this process, a chemical reducing agent is metered into the stream of exhaust gas. The stream of exhaust gas mixed with the reducing agent subsequently passes through suitable SCR catalytic converters, where the exhaust gases are cleaned by chemical reduction. A proven reducing agent is a 32.5% aqueous urea solution according to DIN 70070, which is referred to as ADBLUE® by the industry or as Diesel Exhaust Fluid (DEF) in the United States.

For this purpose, the vehicles in question have to be equipped not only with the required devices and aggregates for exhaust-gas after-treatment, but also with an additional service fluid tank for the reducing agent, aside from the fuel tank. Particularly in the case of industrial and agricultural tractors as well as small and medium-sized construction equipment, the available space is generally quite limited. The fuel tank is often located on one side of the vehicle in a front section (as seen in the driving direction) and it is filled via the service fluid inlet or a filler neck by means of a nozzle. This section of the fuel tank often has an integrated step which, for safety reasons, is provided with anti-slip ribbing, or else it has a mounted step cover that the vehicle driver or maintenance personnel can use, for example, to clean the windshield or to replace the wiper blades. The arrangement of the fuel tank and of the reducing agent tank regularly poses design challenges since especially small and medium-sized vehicles only have limited installation space available and are subject to a number of additional requirements. For instance, the reducing agent tank has to be mounted securely. At the same time, the reducing agent tank should not be installed in an area where high temperatures prevail since this would accelerate the degradation of the urea solution.

Owing to the exhaust-gas after-treatment, as a rule, every time or every other time the fuel tank is filled, the reducing agent tank also has to be filled up. In order for the filling of the tanks not to be overly laborious, it is necessary for the filler necks of both tanks to be on the same side of the vehicle, preferably close to each other.

German patent application DE 10 2008 023 073 A1 describes a tank for service fluids of motor vehicles that consists of two service fluid tanks.

The first service fluid tank serves to hold a fuel such as, for example, diesel, while the second service fluid tank is provided for another service fluid component. The second service fluid tank is arranged at the side of the fuel tank and is combined with it to form a unit. On the side of the fuel tank opposite from the second service fluid tank, there is a step module with steps. Both tanks have a filler neck through which each individual tank can be filled with the service fluid or the service fluid component.

A similar service fluid tank arrangement is disclosed in German patent application DE 10 2009 045 500 A1, which describes a utility vehicle tank. On the outside, a bracket is welded onto an end wall of the fuel tank. An additional tank is joined to the bracket on the end face that faces away from the end wall. The additional tank has its own service fluid inlet or filling opening on the outside. A similar service fluid tank arrangement is also disclosed in European patent application EP 1 736 350 A2. Here, however, the service fluid inlets are relatively far from each other, which makes the filling procedure more difficult.

Moreover, it is a known procedure to adapt the two service fluid tanks to the shape of the available space as closely as possible, which results in asymmetrical and complex tank shapes. For instance, the service fluid tanks can be nested inside each other, whereby sections of the service fluid tank are shaped with the corresponding service fluid inlet in such a way that both tanks can be filled in an area that is easy for the user to access during the filling procedure. The service fluid tank arrangement described in European patent application EP 2 479 393 A1 comprises a fuel tank that is shaped like steps on one side and that forms an installation space for a reducing agent tank. The reducing agent tank is located underneath a cover that covers the filler neck of the reducing agent tank and that has to be opened in order to be filled. The cover has molded-on steps and it serves as a ladder via which the vehicle is accessible.

Restrictive package requirements and tight installation spaces often do not permit a solution involving nesting. Consequently, the reducing agent tank is also often accommodated in another place in the vehicle, for instance, on the other side of the vehicle. In order to prevent that the vehicle has to be filled from two sides, the reducing agent tank is then provided with a long pipe connector, a tube, a pipe or the like, whose end is configured as a filler neck that is situated in the vicinity of the filler neck of the fuel tank. However, such solutions fall short of the expectations of the operators or users and are often felt to be unattractive makeshift solutions.

From actual practice, a cover for a service fluid tank arrangement is known by means of which the service fluid inlets can be physically combined in a single component. The cover has two openings that are placed over filler necks of the fuel tank and of the reducing agent tank, which are configured as service fluid inlets, so that the filler necks project out of the openings of the cover and the remaining area of the filler necks is covered. Irrespective of the shape of the service fluid tank that is present, a visually attractive result can be achieved since the top of the cover can be designed in any desired manner, thereby covering an area of the vehicle that is unattractive because of technical circumstances. At the same time, however, for design-related reasons, the degree of freedom for the arrangement of the service fluid tanks is greatly restricted. Thus, the two service fluid tanks, especially their filler necks, have to be arranged adjacent to each other, and the filler necks have to be positioned very precisely for installation purposes, which is fairly laborious.

SUMMARY

In an embodiment, the present invention provides a cover for a service fluid tank arrangement having a first service fluid tank and a second service fluid tank. The cover includes a housing having a housing wall through which a first opening and a second opening extend. The first opening is configured to be connected to a service fluid inlet of the first service fluid tank and the second opening is configured to be connected to a service fluid inlet of the second service fluid tank. At least one of the first opening and the second opening has a filler neck that extends from the housing wall in at least one direction and is configured as a connector for a service fluid line.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
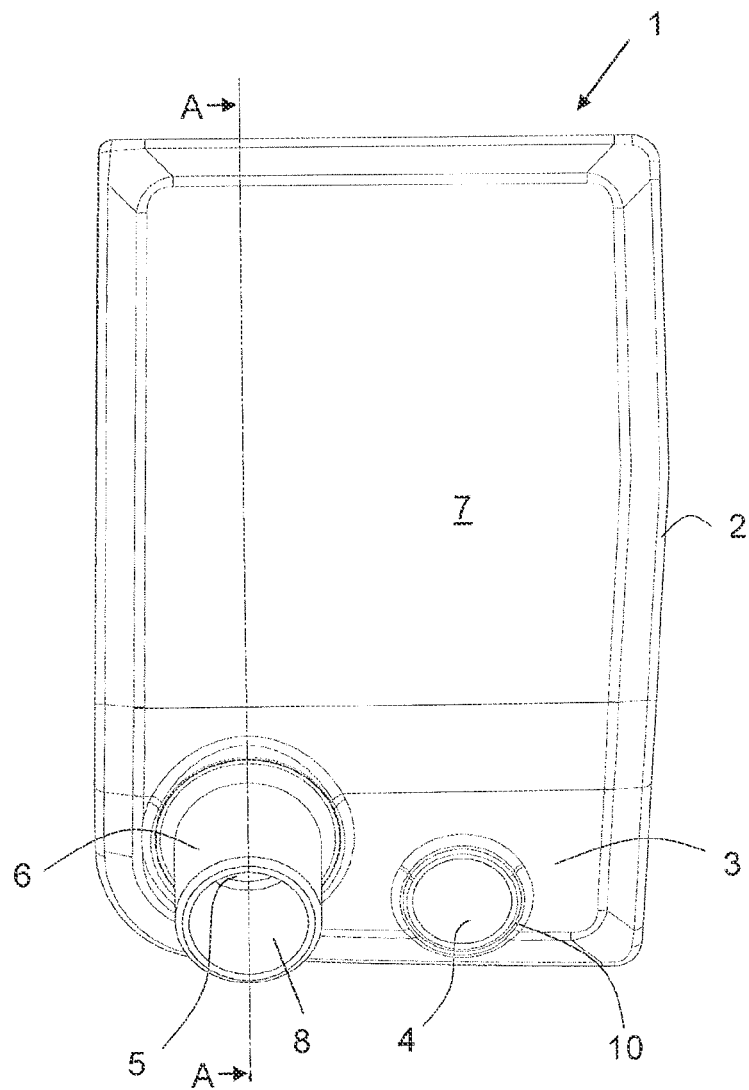
FIG. 1 shows a top view of a cover according to a first embodiment of the invention.

In an embodiment, the present invention allows for the filling of two service fluid tanks in a technically efficient and reliable manner in close physical proximity, whereby a large degree of freedom is ensured when it comes to the design of the service fluid tanks and their positioning in the vehicle. At the same time, it is possible to effectively improve the appearance of the vehicle and to simplify the installation.

At least one of the first or second openings of the cover according to an embodiment of the present invention has a filler neck that extends from the cover housing wall at least in one direction and that is configured as a connector for a service fluid line.

The features according to the invention permit both service fluid tanks to be arranged in the vehicle optimally and with a large degree of freedom. This particularly benefits the ever-increasing requirements in terms of the packaging since the tanks do not need to be placed directly next to each other. Thus, a service fluid line such as a hose, pipe or the like can run from the one service fluid tank to the connector arranged in the cover housing wall and can easily be attached there. The other opening can be connected to the service fluid inlet of the corresponding service fluid tank, for example, in that a filler neck of the service fluid tank is accommodated in the opening through which the service fluid tank can be filled.

In the same manner, a service fluid line can be connected directly to the opening or affixed onto it. This makes it possible to physically and effectively combine the service fluid inlets of two service fluid tanks without the service fluid tanks themselves having to be placed next to each other. The service fluid lines, filler necks and the like that adjoin the openings can be covered in a manner that is visually attractive.

The cover can be positioned at a place on the vehicle that is optimal for filling, and it can be connected to the service fluid tanks via service fluid lines. However, it has proven to be particularly advantageous to arrange the cover in such a way that it at least partially covers at least one of the service fluid tanks. Moreover, the cover according to the invention offers a sturdy arrangement of the filler necks for the service fluid tanks so that damage to the service fluid lines and the like are effectively prevented.

It has proven to be particularly advantageous for the connector to be configured as a detachable plug-in coupling or as a hose nozzle. In this manner, the inside end of the filler neck to which the service fluid line is connected makes an immediate transition to a nozzle-like section. The latter can be molded onto the filler neck or attached separately. The connector can also be configured as a pipe connector or the like to which a service fluid line such as a hose, a pipe, a pipe connector or the like can be attached by means of familiar means such as a hose clamp or the like. The nozzle-like section can also have ribbing, latching elements and/or clamping elements, so that a service fluid line can be clamped and/or affixed to the connector.

Moreover, the cover according to the invention can be configured to be multi-functional in that it is configured as a step cover or the like, whereby the side of the cover housing opposite from the connector is at least partially configured as an anti-slip step surface.

An especially economical embodiment of the invention provides that the cover is made of plastic. Suitable plastics are, for example, thermoplastics such as polyethylene (PE), cross-linked polyethylene (XPE), polypropylene (PP), polyamide (PA) or the like. As far as the production process is concerned, it has proven to be advantageous for the cover to be configured as a blow-molded or rotation-molded plastic part. By the same token, the cover can be an injection-molded part or, depending on the requirements, a sheet-metal construction.

According to the invention, the filler neck can be a separate component that is installed on the cover and that is joined there non-positively, positively, and/or adhesively to the cover. For instance, the filler neck can be affixed to the cover in that it is welded, glued, screwed or the like. However, according to the invention, the filler neck can also be formed integrally with the cover so that the filler neck is formed in one piece with the cover. Preferably, the entire cover is provided as a one-piece component. For example, the filler neck can be molded directly onto the cover by means of a plastic-molding process when the cover is being produced. This eliminates production costs for a separate component. Moreover, reducing the number of individual parts accounts for additional savings in terms of logistics and warehousing.

In order to achieve a high degree of flexibility regarding the arrangement of the service fluid tanks, another embodiment of the invention provides that the other opening of the cover has a filler neck. This can be configured in the same manner as the first filler neck.

Fundamentally, it is possible for the wall of the cover housing to be configured as a single-wall. This can be achieved at low production costs with a sheet-metal construction or an injection-molded plastic part. In a refinement of the inventive idea, the cover housing wall can also be configured to comprise more than one wall, which increases the load-bearing capacity and strength of the cover. Preferably, the cover at least partially comprises a double-wall profile with at least one cavity that is formed at least partially between the walls of the double-walled housing. The cover can be manufactured economically as a blow-molded or rotation-molded plastic part. In a refinement of the inventive idea, the cover housing wall is at least partially filled with foam, thereby further enhancing the stability of the component.

The foaming of the component can be carried out after its production. Two-component polyurethane systems, for example, can be used for this purpose. As an alternative, especially when the component is produced by means of rotational molding, it is possible to process materials which have been rendered expandable through the addition of physical or chemical foaming agents, and which are added to the material that forms the component wall in that they are placed into the mold, either simultaneously ("one shot") or consecutively ("two shot": first the material for the component wall and then the expandable material).

In another embodiment, the present invention provides a service fluid tank system comprising a first service fluid tank and a second service fluid tank, whereby a cover according to the invention is provided whose first opening can be connected to the service fluid inlet of the first service fluid tank and whose second opening can be connected to the service fluid inlet of the second service fluid tank.

According to the invention, the interior of the cover housing wall having the connector can be adapted to the contour of at least one of the service fluid tanks in such a way that the cover is positively held on the at least one service fluid tank when the service fluid inlet of the service fluid tank is connected to the corresponding opening of the cover. In this manner, the cover can be efficiently used to cover not only the service fluid line but also at least one of the service fluid tanks, at least partially, whereby the cover is attached particularly securely to the service fluid tank.

According to another embodiment of the invention, the cover can be configured in such a way that it at least partially covers the first and the second service fluid tanks and positions them relative to each other. Thus, the inside can be configured as a receptacle for a section of the first service fluid tank as well as of the second service fluid tank, and its interior shape can be at least partially adapted to the exterior shape of the appertaining section of the corresponding service fluid tank in such a way that the cover is positively held on the service fluid tank when it is placed onto the service fluid tank. Thus, at least partial areas of the service fluid tank can be efficiently positioned relative to each other. This proves to be especially advantageous in the case of complex and asymmetrical tank structures with narrow and unstable sections in the vicinity of the service fluid inlets, since these areas can be effectively reinforced by the cover.

According to another embodiment of the invention, the cover can at least partially form an inside wall of a service fluid tank and/or it can be formed in one piece with one of the service fluid tanks, whereby the connector is accessible from the outside of the service fluid tank.

FIG. 1 shows a cover 1 in a top view with which the filling of two service fluid tanks can be efficiently combined. The cover 1 is a rotation-molded plastic part and it comprises an essentially rectangular housing 2 with a housing wall 3. A first circular opening 4 and a second circular opening 5 extend through the housing wall 3. At the second opening 5, there is a filler neck 6 that extends from the top 7 of the housing wall 3 and that is configured in one piece with the cover 1. The inside surface 8 of the filler neck 6 is smooth so that a filling element like a nozzle can easily be inserted into the filler neck 6. The first opening 4 and the second opening 5 each serve for connection to a service fluid inlet of a service fluid tank. The service fluid tank in question, especially a fuel tank and a reducing agent tank, is filled via the openings 4, 5.

Figure 2:
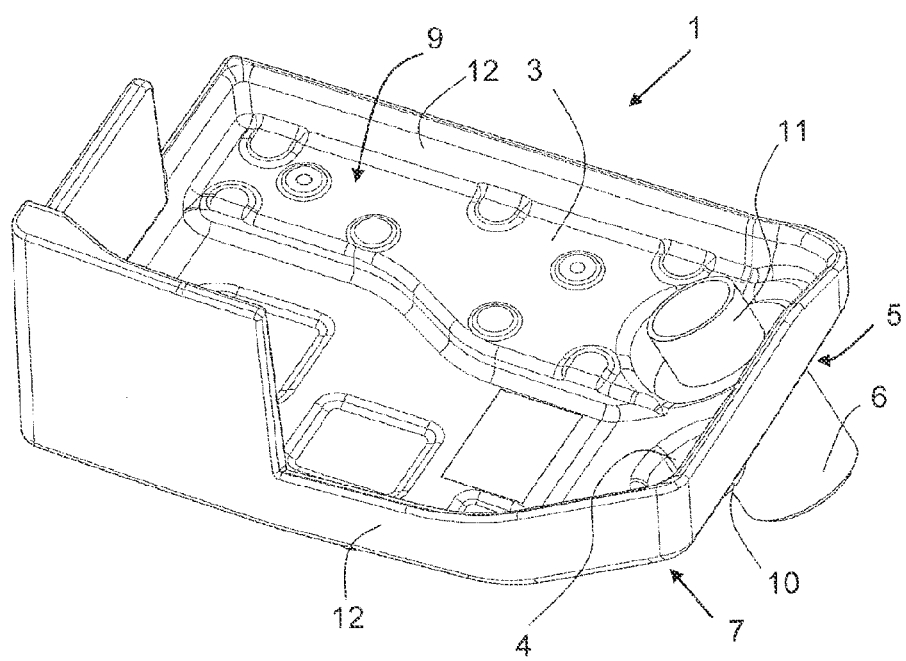
FIG. 2 shows a perspective view of the bottom of the cover from FIG. 1.

FIG. 2 shows a perspective view of the bottom 9 of the cover 1 from FIG. 1. The first opening 4 has a rim 10 that extends from the top 7 outwards. A rim of the first opening 4 on the bottom 9 is configured obliquely or tapered towards the top 7 in order to facilitate the insertion of another filler neck of a service fluid tank. The rim 10 serves as a guide and also supports the inserted additional filler neck, as a result of which a secure fit of this filler neck is ensured.

The filler neck 6 of the cover 1 extends along the inside from the bottom 9 to an inside end. The inside end of the filler neck 6 is configured as a connector 11 for a service fluid line. The connector 11 is shaped like a pipe connector, so that a pipe, a hose or the like can easily be attached to the connector 11, for example, by means of a hose clamp. The cover 1 also has side walls 12 extending from the bottom 9 downwards (in FIG. 2 upwards), so that the bottom 9 of the cover 1 acquires a trough-like contour.

Figure 3:
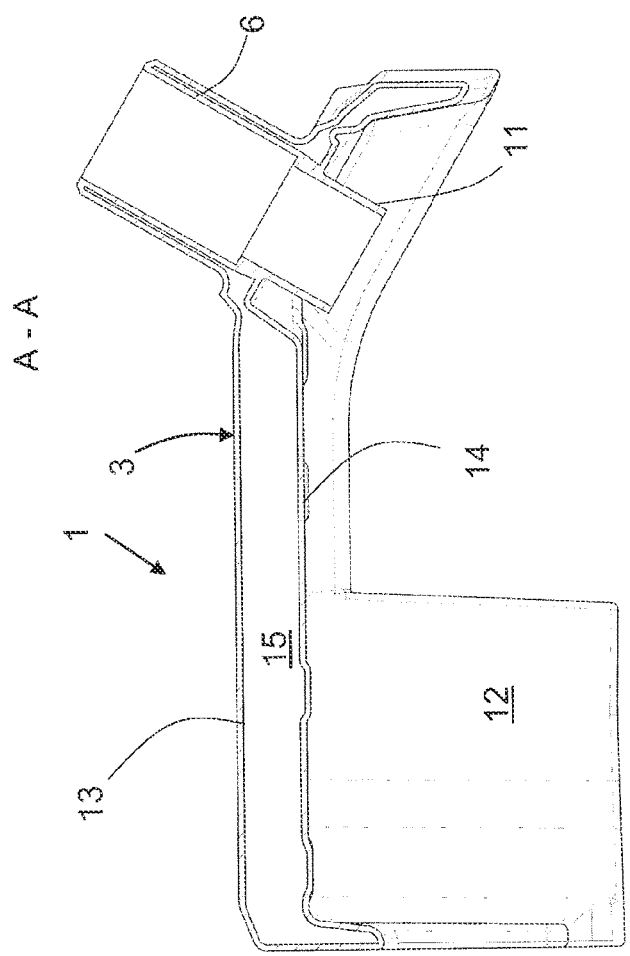
FIG. 3 shows the cover from FIG. 1 in a sectional view.

As the sectional view A-A of the cover 1 in FIG. 3 shows, the housing wall 3 is in the form of a double wall, and it has an upper housing wall section 13 and a lower housing wall section 14. A cavity 15 is formed between the upper housing wall section 13 and the lower housing wall section 14. The filler neck 6 is integrally shaped with the housing wall 3 and, from its connector 11, it makes a transition to the lower wall section 14, whereas the opposite end of the filler neck 6 makes a transition to the upper housing wall section 13.

Figure 4:
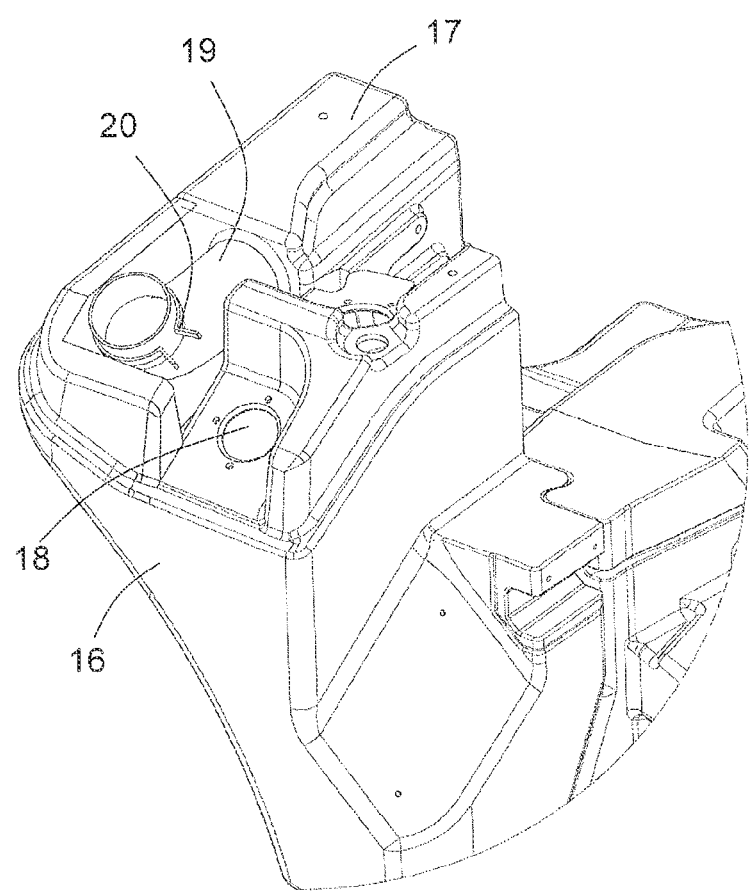
FIG. 4 shows a section of a service fluid tank arrangement.

FIG. 4 shows a service fluid tank arrangement with a first service fluid tank 16, which is configured as a reducing agent tank. A second service fluid tank 17 serves as a fuel tank. The reducing agent tank 16 and the fuel tank 17 each have an asymmetrical and relatively complex structure since they are adapted to the tight space conditions in a vehicle so as to meet the requirements for a utilization of space that is as efficient as possible. As is shown in FIG. 4, particularly the fuel tank 17 is configured to be narrower in the filling area than in a lower area. The reducing agent tank 16 has a filling opening 18 where a reducing agent filler neck can be attached. A service fluid line in the form of a pipe 19 is placed on the fuel tank 17, whereby the pipe 19 is connected to the inside of the fuel tank 17. The pipe 19 serves as a service fluid inlet for the fuel tank 17. A clamp 20 is arranged at the end of the pipe 19 opposite from the fuel tank 17.

Figure 5:
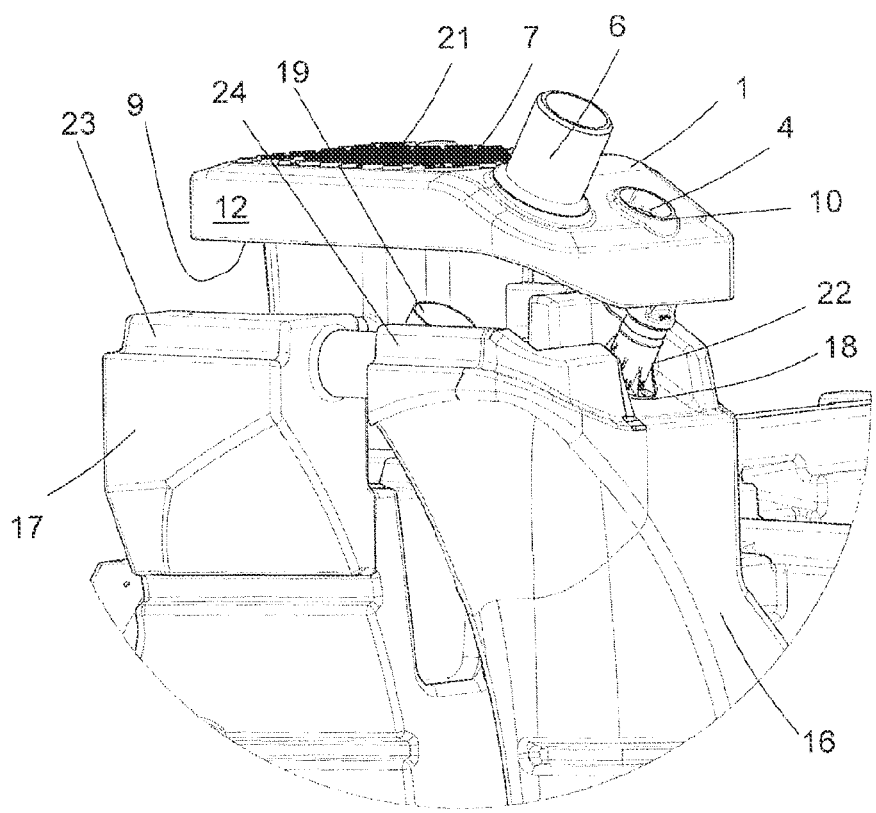
FIG. 5 shows the attachment of a cover according to another embodiment of the invention on the service fluid tank arrangement from FIG. 4.

FIG. 5 is an exploded view showing the components, namely, the reducing agent tank 16 and the fuel tank 17 from FIG. 4 as well as additionally another embodiment of the cover 1. The cover 1 is configured in such a way that it combines the service fluid inlets of the reducing agent tank 16 and of the fuel tank 17 and, at the same time, it forms a cover element for the upper part of the service fluid tanks 16, 17. The cover shown in FIG. 5 corresponds essentially to the cover shown in FIGS. 1 to 3, but on the top 7, it has a textured anti-slip surface 21. A reducing agent filler neck 22 that serves as a service fluid inlet has been secured at the filling opening 18 of the reducing agent tank 16. The upper rims 23 and 24 of the fuel tank 17 and of the reducing agent tank 16 have a step-shaped section. In the area of the upper rims 23 and 24, the reducing agent tank 16 and the fuel tank 17 are adapted to the trough-like bottom 9 of the cover 1.

The cover 1 is connected to the service fluid tanks 16 and 17 in that the pipe 19 is slid over the connector 11 on the bottom 9 of the cover 1 and secured by means of the clamp 20. The service fluid tanks 16 and 17 are moved towards each other. The reducing agent filler neck 22 of the reducing agent tank 16 passes through the first opening 4 of the cover 1. The side walls 12 of the cover 1 are placed over the rims 23 and 24 of the fuel tank 17 and of the reducing agent tank 16, as a result of which they are in contact with the inside of the side walls 12 of the cover 1.

Figure 6:
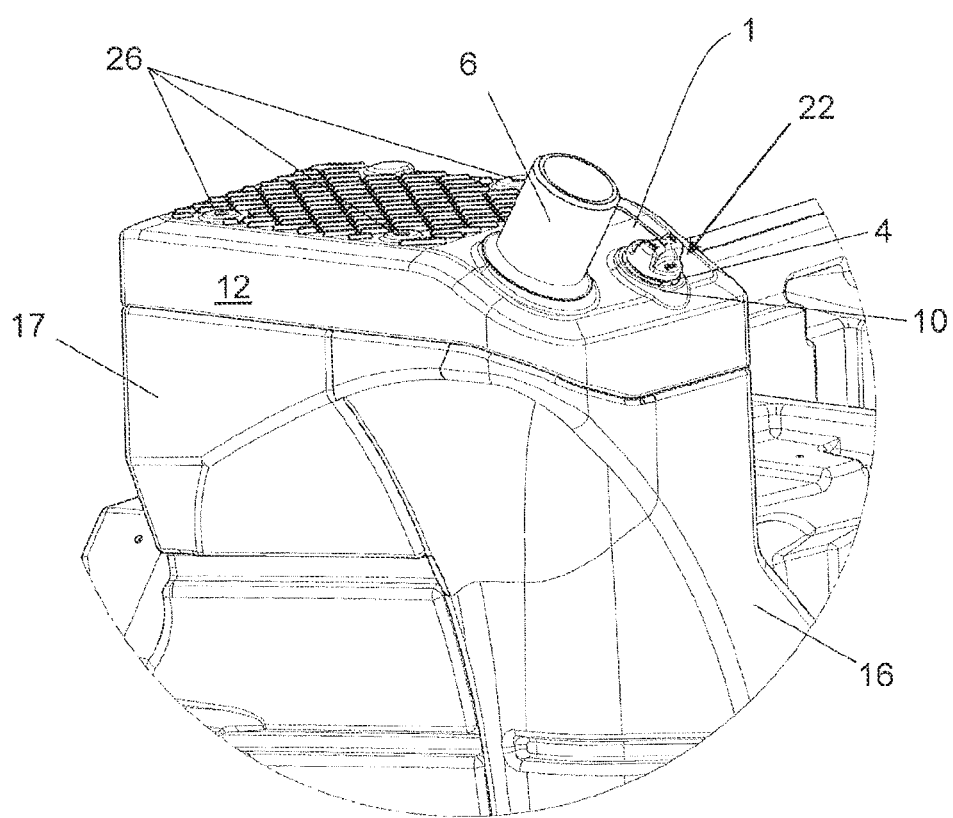
FIG. 6 shows the cover from FIG. 5 in the affixed state.

The assembled state is shown in FIG. 6. The upper rims of the service fluid tanks 16 and 17 from FIG. 5 are accommodated in the trough-like section on the bottom of the cover 1. As a result, the cover 1 is held positively on the service fluid tanks 16 and 17. At the same time, the cover 1 increases the stability of the service fluid tanks 16 and 17 in that it positions the service fluid tanks 16 and 17 relative to each other. Thus, even with complex service fluid tank structures, a high level of stability is achieved, particularly in the upper area of the fuel tank 17. In order to fasten the cover to the service fluid tanks 16, 17 and in order to increase the stability of the entire arrangement, holes 26 are provided in dome-shaped elevations on the cover while threads or threaded inserts are provided in at least one of the service fluid tanks 16, 17 so that the cover 1 can be mounted with screws. As FIG. 6 also shows, the upper end of the reducing agent filler neck 22, which is provided with a tank lid here, extends through the first opening 4 of the cover 1. The rim 10 ensures a secure fit of the reducing agent filler neck 22. The pipe 19 from FIG. 4, which is connected to the inside of the fuel tank 17, is connected to the connector 11 of the filler neck 6. Fuel can be filled into the fuel tank 17 through the filler neck 6.

Both of the service fluid tanks 16 and 17 can be efficiently filled through the cover according to the invention. Here, both access points to the tanks are arranged in close physical proximity to each other, which greatly increases the convenience of the filling procedure. The top 7 of the cover 1 can be configured variably so that the outward appearance of the area in question can be enhanced.

Figure 7:
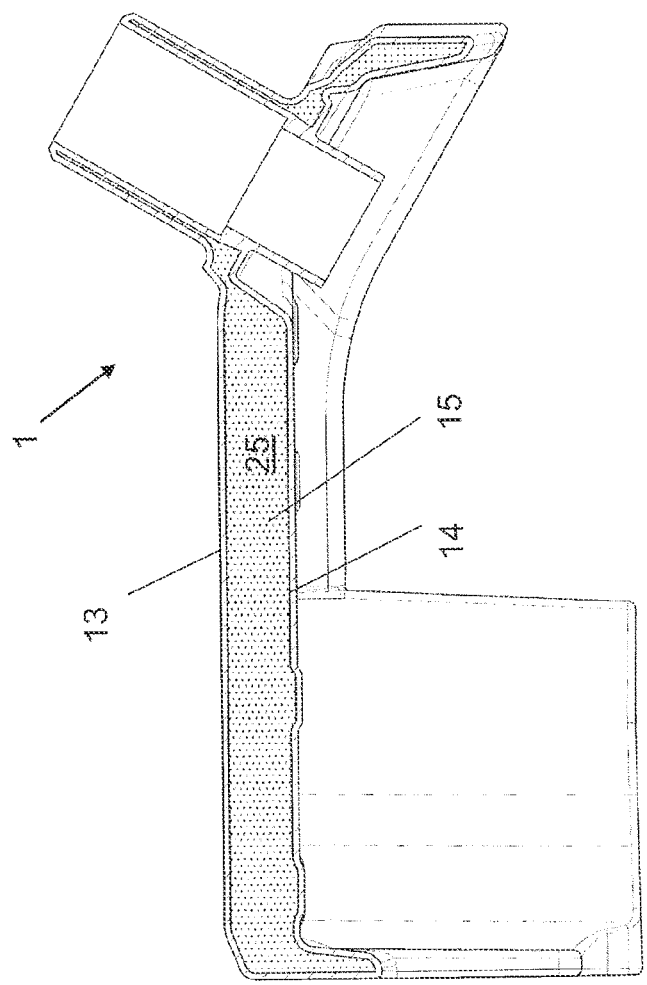
FIG. 7 shows a section through a cover according to a third embodiment of the invention.

In the sectional view of the embodiment of the cover 1 shown in FIG. 7, the cavity 15 is filled with a foam 25 between the lower housing wall section 14 and the upper housing wall section 13, thereby improving the stability of the cover 1. As a result, the cover 1 can efficiently be used as a step or the like. At the same time, it effectively protects the hoses or pipes against damage.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 cover
2 housing
3 housing wall
4 first opening
5 second opening
6 filler neck
7 top
8 inside surface of the filler neck
9 bottom
10 rim
11 connector
12 side wall
13 upper housing section
14 lower housing section
15 cavity
16 first service fluid tank (reducing agent tank)
17 second service fluid tank (fuel tank)
18 filling opening
19 pipe (service fluid inlet)
20 clamp
21 anti-slip structure
22 reducing agent filler neck (service fluid inlet)
23 upper rim of the fuel tank
24 upper rim of the reducing agent tank
25 foam
26 hole

The invention claimed is:

1. A cover for a service fluid tank arrangement having a first service fluid tank and a second service fluid tank, the cover comprising:
    a housing through which a first opening and a second opening extend, the first opening being configured to be connected to a service fluid inlet of the first service fluid tank and the second opening being configured to be connected to a service fluid inlet of the second service fluid tank, the housing at least partially covering a main body of at least one of the service fluid tanks,
    wherein at least one of the first opening and the second openings is surrounded by a filler neck that extends from a first side of the housing and, at a second, opposite side of the housing, has a connector to be configured to be connected to a service fluid line.

2. The cover according to claim 1, wherein the connector is configured as a detachable plug-in coupling or hose nozzle.

3. The cover according to claim 1, wherein the filler neck is formed integrally with the cover.

4. The cover according to claim 1, wherein the cover is made of plastic.

5. The cover according to claim 1, wherein the housing is a double-walled housing in which at least one cavity is formed between the walls of the double-walled housing.

6. The cover according to claim 5, wherein the at least one cavity is at least partially filled with foam.

7. A service fluid tank system, comprising:
a first service fluid tank and a second service fluid tank; and
a cover according to claim 1,
wherein the service fluid inlet of the first service fluid tank is connected to the first opening, and the service fluid inlet of the second service fluid tank is connected to the second opening.

8. The service fluid tank system according to claim 7, wherein the second side of the housing having the connector is adapted to a contour of at least one of the service fluid tanks in such a way that the cover is positively held on the at least one of the service fluid tanks.

9. The service fluid tank system according to claim 7, wherein the cover is configured in such a way that it at least partially covers the first and the second service fluid tanks and positions the first and the second service fluid tanks relative to each other.

10. The service fluid tank system according to claim 7, wherein the cover is a one-piece component.

11. The cover according to claim 1, wherein the cover is a one-piece component.

12. The cover according to claim 1, wherein the connector extends integrally from the second side of the housing.

\* \* \* \* \*